Nov. 18, 1958 P. W. JACOBSEN 2,860,841
REMOTE CONTROL EDGE ALIGNMENT DEVICE
Filed Sept. 16, 1953 5 Sheets-Sheet 1
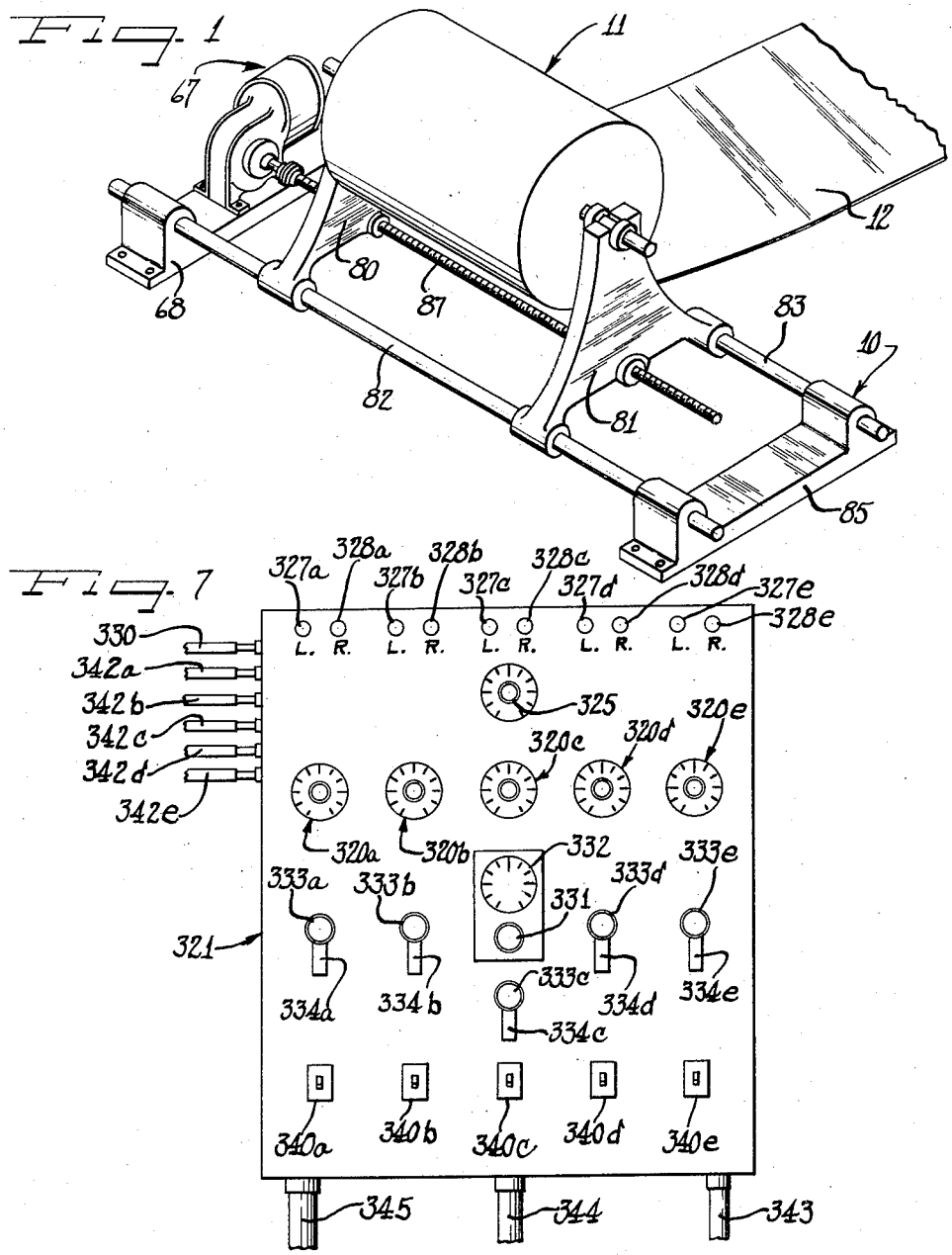
Inventor
Paul W. Jacobsen
Hill, Sherman, Meroni, Gross & Simpson Attys

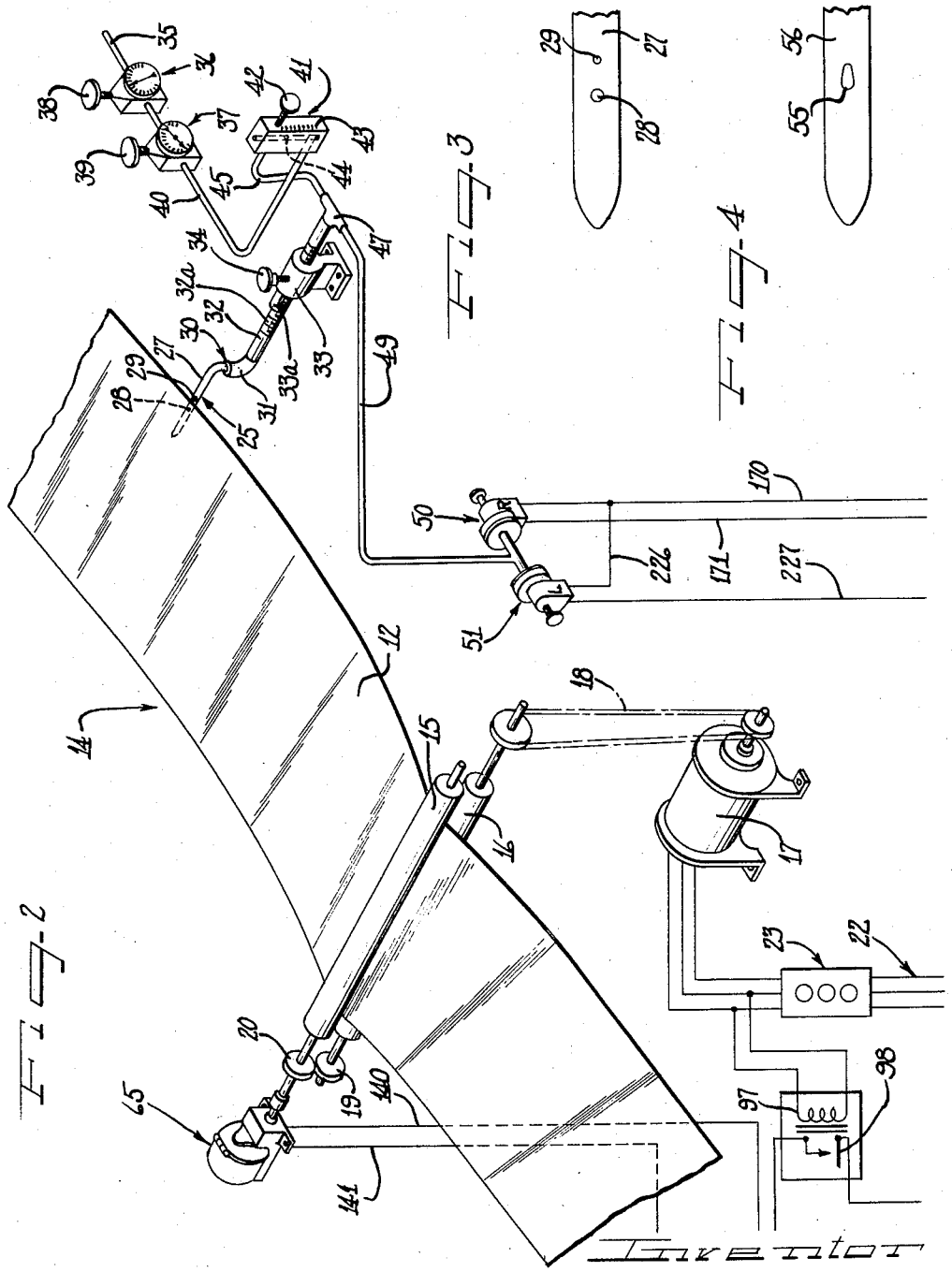

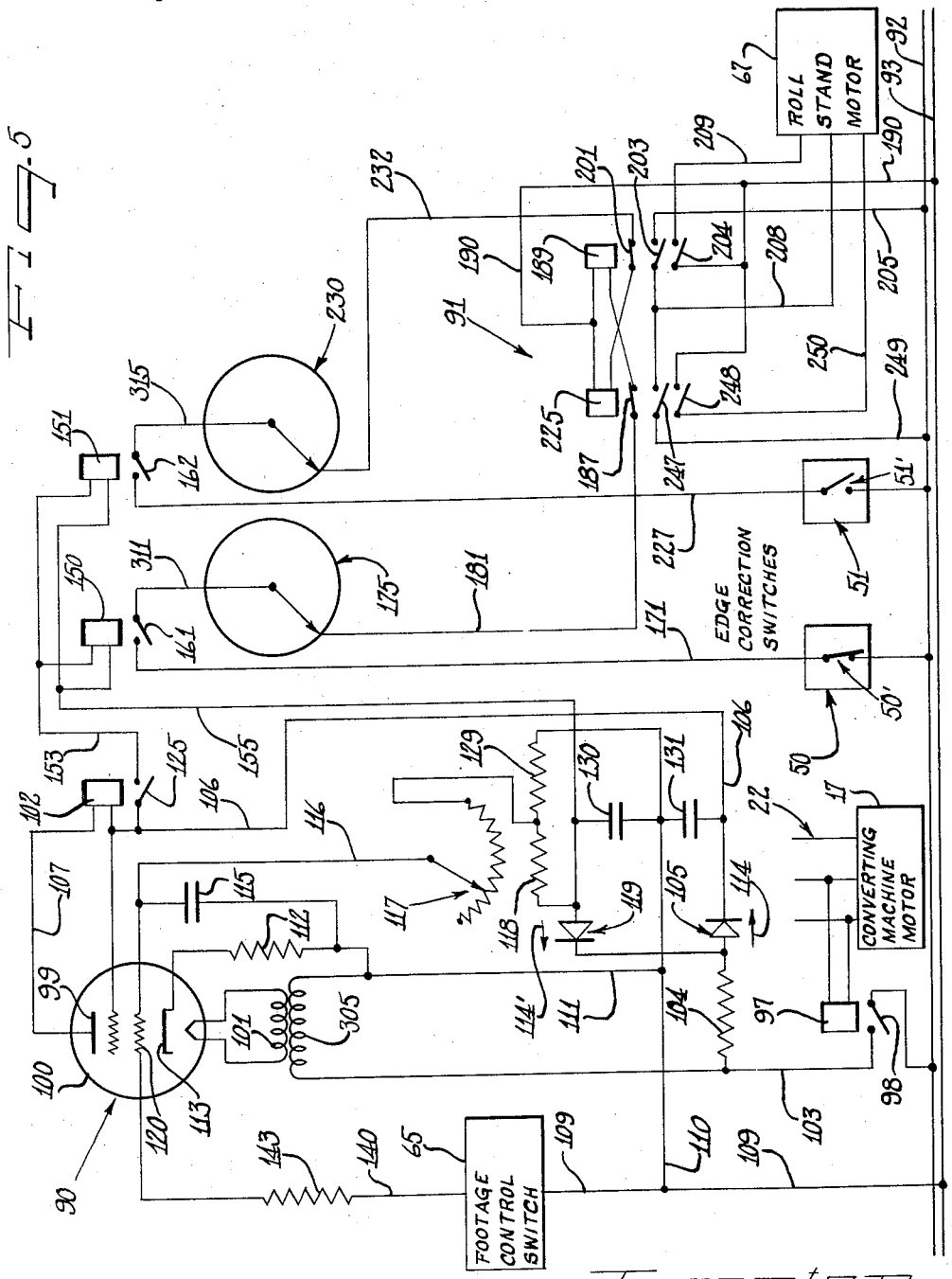

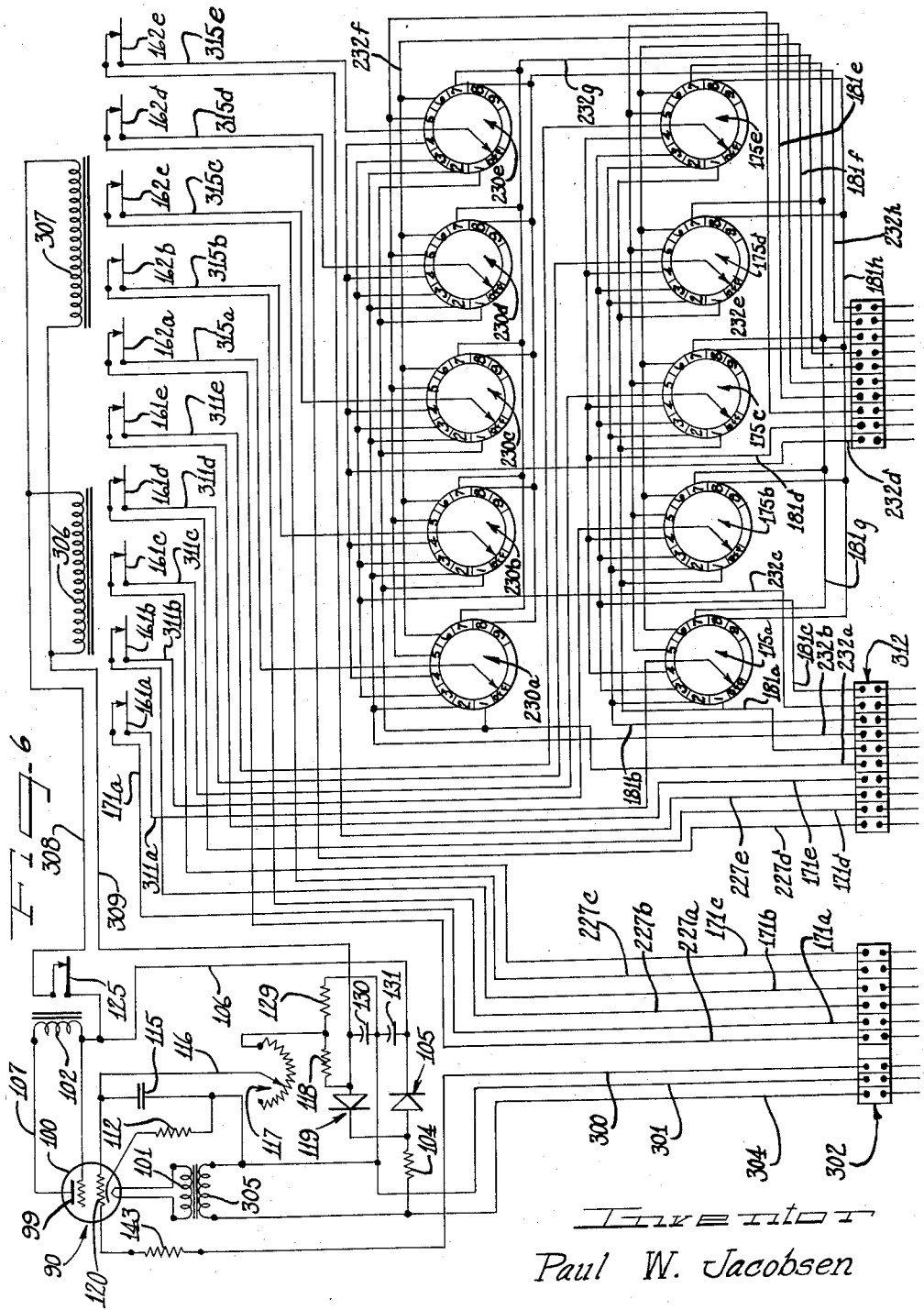

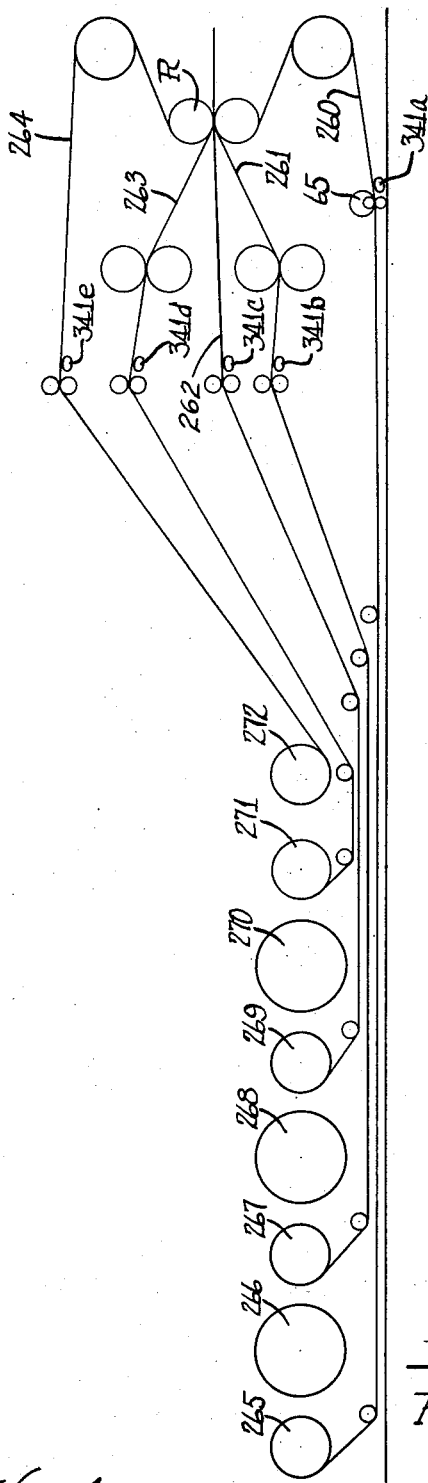

United States Patent Office 2,860,841
Patented Nov. 18, 1958

2,860,841

REMOTE CONTROL EDGE ALIGNMENT DEVICE

Paul W. Jacobsen, Kiel, Wis., assignor to H. G. Weber & Company, Kiel, Wis., a corporation of Wisconsin Application September 16, 1953, Serial No. 380,404

9 Claims. (Cl. 242—57.1)

This invention relates to an edge alignment system and particularly to an edge alignment sensing device therefor.

It is an important object of the present invention to provide a novel edge alignment sensing device.

It is a further object of the present invention to provide a sensing device which is operated in such a manner as to avoid clogging.

It is another object of the present invention to provide an edge alignment sensing device which is adapted to readily receive the edge of the web in operative relation thereto.

It is still another object of the present invention to provide a novel edge alignment system.

It is a further object of the present invention to provide a novel system for promoting continuous operation of a multi-web converter.

It is yet another object of the present invention to provide a highly flexible multi-web edge alignment system.

It is a further object of the present invention to provide a novel control circuit for an edge alignment system.

It is still another object of the present invention to provide a novel control circuit for a multi-web edge alignment system.

Other objects, features and advantages of the present invention will be readily apparent from the following detailed description of a preferred embodiment thereof taken in conjunction with the accompanying sheets of drawings, in which:

On the drawings:

Figure 1 is a fragmentary schematic, perspective view of a roll stand and control motor adapted for use in the present invention;

Figure 2 is a fragmentary schematic, perspective view illustrating the edge alignment sensing device and system according to the present invention;

Figure 3 is a fragmentary enlarged plan view illustrating the edge sensing tube of Figure 2;

Figure 4 is a fragmentary enlarged plan view of a modified form of edge sensing tube according to the present invention;

Figure 5 is a schematic wiring diagram of an electrical control circuit for use in the edge alignment system of the present invention;

Figure 6 is a schematic wiring diagram of a modified electric control circuit for use with a multi-web edge alignment system according to the present invention;

Figure 7 is a schematic elevational view illustrating a control panel suitable for the multi-web alignment system of the present invention; and Figure 8 is a schematic elevational view illustrating a machine wherein eight unwind roll stands are disposed to supply webs to a converting operation under the control of the system of Figures 6 and 7.

As shown on the drawings:

In the drawings, the roll stand 10 is indicated more or less diagrammatically and may comprise any suitable conventional roll stand having means for shifting a roll 11 carried thereby in opposite lateral directions. The roll 11 may comprise an elongated web 12 which is to undergo a converting operation, such as a multi-wall tuber operation, laminating, corrugating, waxing, coating, printing and the like at a remote station 14. In such converting operations, it will be understood that it is desirable that the edge of the web 12 be maintained in a certain lateral position or within a certain range of lateral positions at the converting station.

For purposes of illustration, it is assumed that rolls 15 and 16, Figure 2, represent driven rolls on the converting apparatus and that it is desired to maintain the edge of the web at the general transverse position indicated in Figure 2. A motor 17 is illustrated as driving the rolls 15 and 16 through a belt 18 and cooperating gears 19 and 20 at the opposite end of the rolls from the belt drive 18. The motor 17 is energized from a 3-phase line 22 through a manual control box 23, Figure 2.

An edge sensing device 25 is utilized at the converting station 14 to generate an electric signal whenever the edge of the web is out of its pre-selected lateral position. This electrical signal is utilized in conjunction with a control circuit to be hereinafter described to shift the roll 11 at spaced intervals in a direction to correct for the error in alignment.

In the embodiment illustrated, this edge sensing device 25 is schematically indicated as comprising an elongated tube 27 which is adapted to underlie the edge of the web 12 so that the web slides across the upper surface of the tube. As best seen in Figure 3, according to one embodiment of the invention, the sensing tube 27 is provided with a pair of spaced apertures 28 and 29 in the edge-receiving surface. The edge of the web is disposed between apertures 28 and 29 in aligned position of the web.

The sensing tube 27 is swivelly mounted by means of a swing joint indicated at 30 in a right angle connector 31 carried by an adjustable supply tube 32. The tube is slidably mounted in a block 33 and has a clamp screw 34 for clamping the tube 32 in the desired position. A reference arm 33a of the block 33 cooperates with the indicia 32a on the tube to indicate the axial position of the tube 32 relative to the block 33.

Air under relatively low pressure is supplied to the tube 32 and thence to the sensing device 27 from the supply line 35 which may, for example, be connected to plant air pressure of the order of 125 pounds per square inch. The air travels through two pressure reducing valves 36 and 37, the first valve 36 being adjustable by means of a knob 38 and, for example, reducing the pressure to 10 pounds, and the second reducing valve 37 having a pressure adjustment knob 39 for setting the outlet pressure between 0 and 2 pounds. From the second reduction valve 37, air travels through the line 40 to the bleeder valve 41 which has a needle valve control screw 42 for adjusting the rate of flow therethrough, and which has indicia 43 thereon for indicating the rate of flow through the vertical tube 44 to the line 45. From the connection 47, air flows to tube 32 and also through the line 49 to the static pressure actuated diaphragm type electric switches 50 and 51. These switches are set to detect the difference in pressure in the line caused by obstruction of the apertures 28 and 29 by the edge of the web 12.

By way of example, the contacts 50' (Figure 5) of the switch 50 may be set to open when pressure in the line reaches ½ inch of water above gauge pressure, and may be normally closed; while the contacts 51' of switch 51 may be set to close at ¾ of an inch of water above gauge pressure, and may be normally open. The system may be so adjusted that when the edge of the web is to the left of both apertures 28 and 29, pressure in the line will be below ½ inch of water so that the switch 50 will be closed. The control circuit under these circumstances will be actuated to move the web to the right, the letter "R" on switch 50 indicating that the web is moved to the right (when facing in the direction of travel of the web) when switch 50 is closed. With the edge of the web obstructing the aperture 28, but not obstructing the aperture 29, the system is so adjusted that the pressure in the line 49 will be between ½ inch and ¾ inch of water. Under this condition, both switches 50 and 51 will be open, and no correction is called for by the system. When the edge obstructs both the apertures 28 and 29, the system is so adjusted that the pressure in the line 49 will rise above ¾ inch of water and the switch 51 will be closed to signal for an adjustment of the web to the left, the letter "L" on switch 51 indicating that the web is moved to the left when switch 51 is closed.

It will be noted that 0.5 inch of water represents an increase from atmospheric pressure of 0.122% and 0.75 inch of water represents an increase from atmospheric pressure of 0.184%. These differentials in pressure require only very low rates of flow through the apertures 28 and 29 to actuate the switches 50 and 51. Flow rates of the order of 3 cubic feet per hour are sufficient. Thus there is no danger of the web being blown away from the detector tube 27. This has been found to be true even of very light weight webs.

For best operation of the system, it has been found desirable that the inner vent hole 28 be approximately twice the area of the outer hole 29. This proportion of areas corresponds to a differential increase in pressure in the line 49 of ½ inch of water for obstruction of the large area aperture 28, and to an increase of only ¼ inch of water for obstruction of the smaller area aperture 29. In other words, for the aforementioned setting of switches 50 and 51, the increment in pressure required due to obstruction of aperture 28 is twice the increment required when aperture 29 is obstructed. By way of example, the apertures 28 and 29 may be circular, and the aperture 28 may have a diameter of ³⁄₃₂ of an inch and the aperture 29 have a diameter of ¹⁄₁₆ of an inch.

Alternatively, as indicated in Figure 4, a single aperture 55 may be utilized in an edge sensing tube 56 for detecting edge misalignment. In this case, in neutral position of the web, ⅔ of the area of the aperture 55 may be obstructed by the edge of the web 12. The aperture 55 may be of a tapered configuration so that ⅔ of the area is obstructed with the edge of the web midway between the lateral margins of the aperture.

As will hereinafter be described, the control circuit including the switches 50 and 51 is so arranged as to move the roll 11 to the left at intervals so long as the edge of the web 12 obstructs both apertures 28 and 29, and to move the roll 11 to the right at intervals so long as the web fails to obstruct flow from either aperture 28 or 29. Control is accomplished by shifting the roll laterally in the proper direction for a short distance, as for example, ⅛ inch to ¼ inch. After each lateral shifting of the roll, an interval may be provided to allow the portion of the web leaving the roll after the correction increment to reach the converting station. In this case, after each correction, the position of the roll is not again corrected until the effect of the previous correction can be detected by the edge sensing device 25.

However, corrections can be applied at shorter intervals. When the web is unsupported from the roll stand to the converting operation, it will be appreciated that any shifting of the roll stand is almost immediately effective to shift the position of the web at the converting operation. Under such circumstances, it may be advantageous to shorten the intervals at which correction is permitted. The interval can be shortened so that a portion unwinding from the roll 11 at the end of a correction will travel only ¾ or the distance to the converting operation before a further correction is applied.

In the present embodiment, the interval between correction is interposed by means of a footage control switch 65. The manner in which the footage control switch cooperates with the other elements of the control system will be hereinafter described. It will be understood that the footage-type measuring device is preferable to a timer for determining correction intervals where the speed of the converting operation will vary considerably and it is desired to apply a correction after a uniform amount of travel of the web. When the interval between corrections is determined by means of a timer, it would be desirable to install a centrifugal switch at the converting operation which would open the automatic edge aligning circuit when the converting operation slows down too much so as to prevent over-control of the web.

Referring to Figure 1, it will be seen that lateral adjustment of the roll 11 is accomplished by means of a reversible motor 67 mounted on a base member 68 of the roll stand 10. A pair of cradle members 80 and 81 are mounted on guide rods 82 and 83 extending between the base member 68 and a base member 85 of the roll stand. The motor 67 is illustrated as driving a screw 87 which threadedly engages the cradle members 80 and 81 and moves them to the left or right, depending upon the direction of rotation of the motor 67.

The amount of lateral distance that the roll 11 is moved by each correction signal from detector 25 is controlled by means of an electronic timing circuit 90 illustrated in Figure 5. For example, lateral adjustments of ⅛ inch to ¼ inch may be obtained for each correction signal transmitted to the motor control circuit indicated at 91 in Figure 5 by setting the timing circuit 90 to allow energization of the motor for from 2 to 4 seconds per correction signal.

The motor 67 may be energized from a 115 A. C. line 92, 93, Figure 5, under control of the circuit 91. For automatic remote edge alignment, the timing circuit 90 is actuated by the footage control switch 65 to start a timing cycle. If during this timing cycle the edge is out of alignment, the motor reversing control circuit 91 is called into operation to energize the motor 67 in the proper direction for the duration of the timing cycle.

To intercept correction signals from the edge sensing device 25 when the converting operation has been stopped, a lock relay 97, Figures 2 and 5, is provided which will open when the converting motor 17 is deenergized to open contact 98 and deenergize the timing circuit 90. Thus, even if the converting operation should be stopped at a point where the footage control switch were closed no correction signals would reach the motor control circuit 91.

*Operation of timing and motor control circuits*

The manner in which the footage control switch 65 connects the edge sensing switches 50 and 51 in circuit with the motor control circuit 91 will now be described.

It will be observed that the timing circuit 90 includes a vacuum tube 100, which may for example be a type 6AS5 tube. The tube may have heater current supplied from a 6 volt secondary winding 101, the primary 305 being connected across 115 volt A. C. supply lines 92 and 93. A relay coil 102 is connected in the plate circuit of the tube 100. Voltage is supplied to the plate 99 of tube 100 from supply conductor 92 through line 103, resistor 104, rectifier element 105, conductor 106, relay coil 102 and conductor 107. Thus when supply line 92 is positive with respect to line 93, plate electron current may flow from supply conductor 93, through conductors 109, 110 and 111, cathode resistor 112, cathode 113 to plate 99 and thence to supply conductor 92 through rectifier element 105. Arrows 114 and 114' indicate the direction of positive current flow through rectifiers 105 and 119.

When line 92 is negative with respect to line 93, a condenser charging circuit extends (in the direction of positive current flow) from line 93 through conductors 109, 110 and 111, condenser 115, line 116, variable resistor 117, resistor 118, rectifier element 119, resistor 104 to supply line 92. It will be observed that charging of condenser 115 tends to make the grid 120 of tube 100 negative with respect to the cathode 113 so that plate current will be at a low value or zero, and relay coil 102 will be deenergized and relay contact 125 in its normal open position. The charging circuit is in parallel with a circuit extending from conductor 93 along conductors 109 and 110 to resistor 129 and then through resistor 118, rectifier 119, resistor 104 to supply conductor 92. Condensers 130 and 131 are provided for filtering the rectified voltage supplied through the rectifiers 105 and 119.

The function of the footage control switch 65 will now be readily understood. The footage control switch has line 109 connected through lines 110 and 111 to the lower plate of condenser 115, and has a conductor 140 leading through resistor 143 and grid 120 of the tube 100, to the upper plate of condenser 115. Thus, when the footage control switch 65 closes, the plates of condenser 115 are shorted through the circuit including grid 120, resistor 143 and the footage control switch 65. Since resistor 143 has a relatively low value, it will be understood that the condenser 115 will discharge rapidly, making the grid 120 less negative with respect to the cathode 113 of tube 100. Under these circumstances, the tube 100 is designed to pass current on the positive half cycles of the supply voltage to energize relay coil 102 and close contact 125.

As soon as the footage control switch has acted to discharge the condenser 115, the footage control switch opens and thus allows the recharging of the condenser with the eventual cut off of the tube 100 and deenergization of the relays 150 and 151 to stop the motor 67. The time at which cut off occurs is, of course, dependent upon the rate of charging of the condenser 115, and this in turn is controlled by the variable resistor 117. The variable resistor may be selected so as to adjust the time required for recharging of the condenser 115 between 0 and 6 seconds.

By way of example, the circuit elements of the timing circuit 90 may have the following values:

| | | |
|---|---|---|
| Resistor 104 | ohms | 25 |
| Resistor 118 | do | 25,000 |
| Resistor 129 | do | 40,000 |
| Resistor 143 | do | 220 |
| Resistor 112 | do | 150 |
| Condenser 115 | microfarads | 4 |
| Condensers 130 and 131 | do | each 12 |

With contact 125 closed, relay coils 150 and 151, Figure 5, are energized on the positive half cycles of the supply, from conductor 92 through resistor 104, rectifier 105, conductor 106, closed contact 125, conductor 153 through relay coils 150 and 151 in parallel, conductor 155, resistors 118 and 129, conductor 110 to supply conductor 93. Relays 150 and 151 thus move contacts 161 and 162 to closed position.

If now the switch 50 is closed due to the web being too far to the left, a circuit is completed from supply conductor 92 through switch 50, line 171 through contact 161 and line 311 to selector switch 175 and from selector switch 175 through line 181, normally closed contact 187, relay energizing coil 189, conductor 190, to supply line 93. Energization of relay coil 189 opens contact 201 and closes contacts 203 and 204 to complete an energizing circuit for the motor 67 extending from the supply conductor 92 through line 205, contact 203, conductor 208 through the reverse winding of the motor 67 and returning through conductor 209, contact 204 to supply conductor 93.

Similarly, when the relay coils 150 and 151 are energized by the actuating circuit 90, Figure 5, and switch 51 is closed indicating that a correction to the left is required, the relay coil 225 of the motor control circuit 91 of Figure 5 is energized through the following circuit: From the main supply conductor 92 through correction switch 51, conductor 227, contact 162, line 315, selector switch 230, conductor 232 normally closed contact 201, relay energizing coil 225, conductor 190 to supply line 93.

Energization of relay coil 225 opens normally closed contact 187 and closes normally open contacts 247 and 248. The motor 67 is then energized in the opposite direction through a circuit which extends as follows: From main supply conductor 92 through line 249, contact 247, conductor 208, through the forward winding of the motor 67 and through conductor 250, contact 248, to supply conductor 93.

As previously, the actuating and timing circuit 90 opens contacts 161 and 162 to interrupt operation of the motor 67 at the end of the correction cycle.

*Operation of single roll correction system*

The operation of the electric control circuit for translating correction signals from the switches 50 and 51 of the edge alignment sensing system into lateral adjustments of the roll stand may be summarized as follows.

When the converting machine motor 17 is energized from the 3-phase line 22, lock relay 97 is energized closing contact 98 to apply the supply voltage from supply conductor 92, through contact 98 to the conductor 103 of the actuating circuit 90.

Thereafter, each time the footage control switch 65 closes momentarily to initiate a corrrection cycle, the condenser 115 is discharged through grid 120 and resistor 143 to make the grid 120 less negative with respect to the cathode and to allow plate current to energize the relay 102 closing contact 125. In this manner, relays 150 and 151 are energized each time the footage control switch 65 momentarily closes.

When the footage control switch 65 opens after a momentary closure, condenser 115 begins charging through variable resistor 117 to render the grid gradually more negative with respect to the cathode, and eventually to release relay 102 and consequently relays 150 and 151 to terminate the correction cycle.

During the correction cycle, if the edge is out of alignment so that a correction to the right is required, contacts 50' of correction switch 50 will be closed, and motor control relay 189 will be energized through contacts 161 and selector switch 175. Closure of contacts 203 and 204 of relay 189 causes energization of motor 67 to move the roll 11 to the right.

Similarly, if during a correction cycle, the web needs correction to the left, the contacts 51' of switch 51 will close, left motor control relay 225 is energized through contact 162 and selector switch 230, and roll stand motor 67 is energized to move the roll 11 to the left.

*Multi-web edge alignment system*

In many applications, such as a multi-web laminator, a number of webs are fed to a converting station, where the various webs must be in alignment. Under such circumstances, an edge alignment sensing device such as illustrated at 25 in Figure 2 would be utilized for each web, and the sensing devices would be so related as to align the edges of the respective webs.

In the illustrated embodiment, it is contemplated that five webs are to be mutually aligned in this manner, and that the five webs are to be obtained from a group of eight unwind stands, five of the unwind stands being active at any particular time, and three of the stands being used to prepare new rolls for use upon expiration of the five active rolls.

Under these circumstances, a single footage control switch such as 65 may be used and may be associated with the longest span of web so that the frequency of correction for all stands is based upon the distance from the outermost stand to the converting operation.

The control system for the multi-web edge alignment system of the present invention is illustrated in Figure 6. It will be observed that the timing circuit 90 for the multi-web control system may be identical to that illustrated in Figure 5, and corresponding reference numerals have been applied to corresponding parts. Reference is made to the description of the operation of Figure 5 from which the operation of the timing circuit of Figure 6 will be readily understood.

A footage control switch similar to 65 may be connected between conductors 300 and 301 in Figure 6 by means of the terminal strip 302. Supply voltage may be applied to conductors 301 and 304 through a contact such as shown at 98 in Figure 5 controlled by energization of the converting machine motor to supply voltage to the primary winding 305, the plate circuit, and the charging circuit as in the previously described embodiment.

Closure of the footage control switch associated with the longest span web, will cause the relay 102 to be energized as previously, closing contact 125. Closure of contact 125 causes energization of multiple contact relays 306 and 307 from supply conductor 304 through resistor 104, rectifier element 105, conductor 106, contact 125, conductor 308, relay coils 306 and 307 in parallel, conductor 309, resistors 118 and 129, to supply conductor 301. As illustrated in Figure 6, when relay 306 is energized, contacts 161a–e will be closed and when relay 307 is energized, contacts 162a–e will be closed.

It will be readily understood that each pair of contacts such as 161a and 162a correspond to the contacts 161 and 162 in Figure 5, and that conductor 171a leading to contact 161a may be connected to one supply line at the potential of conductor 304 under the control of a correction switch corresponding to the switch 50 of Figure 5. The conductor 311a on the other side of contact 161a leads to the selector switch 175a corresponding to the selector switch 175 in Figure 5. Line 181a leading from the No. 1 position of selector switch 175a is connected through terminal strip 312 with a motor control circuit such as 91 in Figure 5 for actuating a relay such as 189 for controlling one of the eight roll stand motors. Similarly, the conductor 181b is connected to the No. 2 position of selector 175a and connects through the terminal strip 312 with a second roll stand control circuit. Conductors 181c, d, e, f, g and h connect positions 3 through 8 of selector switch 175a with the other six roll stand control circuits. Analogously, four additional switches corresponding to switch 50 of Figure 5 are connected in lines 171b–e, respectively, between the above mentioned one supply line and contacts 161b–e. Conductors 311b–e connecting to the other sides of contacts 161b–e lead respectively to the moving arms of selector switches 175b–e.

It will be noted that selector switches 175b, 175c, 175d and 175e also have their stations 1 through 8 connected with conductors 181a–h, respectively, so that any one of the five selector switches 175a–e can be connected in circuit with any one of the eight motor control circuits corresponding to circuit 91 in Figure 5.

For example, if the selector switches 175a–e are set to connect to the first five motor control circuits through conductors 181a–e, then contact 161a would be in series with conductor 181a through selector 175a; contact 161b would be in series with conductor 181b through selector 175b; and etc. It will be apparent that any one of the eight roll stands may be connected for control by any one of the five correction switches corresponding to switch 50 in Figure 5, the five switches being connected in series respectively with conductors 171a–171e in Figure 6.

The operation of selector switches 230a–e which are connected in series with contacts 162a–e and conductors 227a–e from the five correction switches corresponding to switch 51 in Figure 5 is entirely similar to that just described for selector switches 175a–e. Also, as previously, the selector switches 230a–e have stations 1 through 8 for connecting with conductors 232a–h which lead to the 8 motor control circuits for actuating relays such as 225 in Figure 5.

It will be understood that the selector switches 175a and 230a may conveniently be ganged and operated by a single knob 320a on a control panel 321, Figure 7. Similarly, for the other pairs of selector switches such as 175b, 230b.

Referring to the control panel indicated in Figure 7, it will be observed that a knob 325 may be provided for controlling the variable resistor 117 to adjust the duration of the correction cycle. Also, indicator lamps 327a–e and 328a–e may be provided, the lamps, for example, being connected between lines 311a–e, 315a–e and the common return line at the potential of line 301 so that each lamp is energized upon the coincident closure of one of the correction switches and the associated contact 161a–e or 162a–e.

It will be understood that the plant supply air pressure may be supplied through the conduit 330, Figure 7, and that pressure may be varied for example, between 0 and 2 pounds by the knob 331 corresponding to the knob 39 in Figure 2 and that the selected pressure may be indicated on the dial 332. The bleeder flow meters may have their adjustment knobs 333a–e on the front of the panel and the flow indicators corresponding to the indicator 44 in Figure 2 and designated by the reference numerals 334a–e indicate the rate of flow in the five branch lines 342a–e to the respective five edge sensing devices at the converting station.

It will be understood that toggle switches 340a–e may comprise five double pole switches controlling lines 311a–e and 315a–e to prevent automatic actuation of the five active roll stands.

The reference numeral 343 may indicate the 115 volt A. C. supply line, while cable 344 may serve to connect the footage control switch of the longest span web into the timing circuit 90. The cable 345 may contain conductors which connect with the control circuits of the eight roll stand control circuits.

*Operation of multi-web edge alignment system*

Assuming that eight unwind stands associated with a given converting station are all supplied with rolls such as 11 in Figure 1, five of the webs 12 from five of the unwind stands are threaded into the converting station, the longest web being associated with a footage control switch such as 65 in Figure 2 and each of the five webs being disposed in operative relation to one of five edge alignment sensing devices such as 25 in Figure 2. Designating the five unwind stands which are first to be used by numbers 1 through 5, and, assuming conductors 181a–e and 232a–e lead to the motor control circuits of unwind stands 1—5, respectively, then selector switches 175a and 230a would be moved to station 1 by means of knob 320a, Figure 7; selector switches 175b and 230b would be moved to position 2 by knob 320b; etc.

Thereafter, each time the footage control switch for the longest web closes, the correction switches associated with each alignment sensing device would be operative to control the motor control circuits 1—5. Assuming the correction switches such as 50 and 51 in Figure 2 to be designated by the numbers 1—5, each being associated with one web as the converting station, and assuming web No. 1 required correction to the right, a circuit would extend through conductor 171a, contact 161a, selector 175a, conductor 181a and from thence to the relay corresponding to relay 189 in Figure 5 of the motor control circuit No. 1.

Similarly, if web No. 2 required correction to the left, a circuit would be closed from the supply conductor through conductor 227b, contact 162b, selector switch 230b, conductor 232b to the relay corresponding to relay 225 of Figure 5 of motor control circuit No. 2 to shift the roll to the left.

When the five rolls at stands 1 through 5 are exhausted, the three rolls from stands 6, 7 and 8 may be immediately threaded to replace three of the webs at the converting station and only two additional roll stands need be supplied with fresh rolls before the converting operation can continue. Assuming that roll stands 6, 7 and 8 were disposed to replace roll stands 1, 2 and 3, respectively, selector switches 175a and 230a would be moved to position 6, for example; selector switches 175b and 230b would be moved to position 7; and selector switches 175c and 230c would be moved to position 8 to connect roll stands 6, 7 and 8 in circuit with edge sensing device correction switches 1, 2 and 3 at the converting station.

*Specific example of multi-web operation*

By way of specific example, a conventional arrangement of roll stands is illustrated in Figure 8 to which the circuit of Figure 6 may be applied in a manner analogous to the way in which the circuit of Figure 5 is applied to the web 12 of Figure 2. Five webs are shown being supplied to the converting operation.

The five webs 260—264 are illustrated in Figure 8 as being supplied from five active rolls 265, 267, 269, 271 and 272 which are in a partially depleted condition. The webs travel over suitable rollers and past five web detector nozzles 341a, 341b, 341c, 341d and 341e, and are guided into superimposed relation at rollers R.

When any of webs 260—264 from active rolls 265, 267, 269 and 271 and 272 are about depleted, the converting operation may be shut down, and the webs 260, 261 and 262 spliced to rolls 266, 268 and 270 respectively. Rolls 271 and 272 may be replaced by new rolls which would be spliced to webs 263 and 264.

If conductors 181a–h and 232a–h lead to the motor control circuits for rolls 265–272 respectively and assuming that conductors 171a–e and 227a–e lead to the correction switches associated with web sensing nozzles 341a–e, respectively, then roll 266 would be activated by switching selector switches 175a and 230a from position 1 to position 2. To activate rolls 268 and 270, selector switches 175b and 230b would be moved from position 3 to position 4; and selector switches 175c and 230c would be moved from position 5 to position 6. The footage control switch would be associated with the longest span 260 and would be connected between conductors 300 and 301 in Figures 6 as previously mentioned.

It will be apparent that many modifications and variations may be made without departing from the scope of the novel concepts of the present invention.

I claim as my invention:

1. An edge alignment control circuit for an elongated traveling web comprising reversible motor means for shifting a roll in opposite directions, first and second relay means controlling operation of said motor to shift the roll in opposite directions, first and second correction signalling switches controlling actuation of said first and second relay means, respectively, further relay means also controlling actuation of said first and second relay means, means for actuating said further relay means, said actuating means including switch means operative at intervals to initiate an edge correction cycle and timing means controlling the duration of said edge correction cycles, rotary means engaging the web for rotation in synchronism with the speed of movement of said web, and said switch means comprising a footage control switch driven by said rotary means and thereby responsive to the speed of movement of the web and having contacts which are actuated each time a predetermined length of web travels past said switch irrespective of speed variations of said web.

2. An edge alignment control circuit for an elongated traveling web comprising reversible motor means for shifting a roll in opposite directions, first and second relay means controlling operation of said motor to shift the roll in opposite directions, first and second correction signalling switches controlling actuation of said first and second relay means, respectively, further relay means also controlling actuation of said first and second relay means, means for actuating said further relay means, said actuating means comprising an electronic circuit including a vacuum tube having a plate circuit controlling said further relay means and having a grid-cathode circuit including a condenser, a charging circuit for said condenser for charging said condenser to a value preventing actuating of said further relay means, a discharge circuit for said condenser, and a footage control circuit responsive to variations in the speed of movement of the web and controlling said discharge circuit and actuated each time a predetermined length of said web travels thereby irrespective of speed variations of said web.

3. An edge alignment control circuit for an elongated traveling web comprising reversible motor means for shifting a roll in opposite directions, first and second relay means controlling operation of said motor to shift the roll in opposite directions, first and second correction signalling switches controlling actuation of said first and second relay means, respectively, further relay means also controlling actuation of said first and second relay means, means for actuating said further relay means, said actuating means comprising an electronic circuit including a vacuum tube having a plate circuit controlling said further relay means and having a grid-cathode circuit including a condenser, a charging circuit for said condenser for charging said condenser to a value preventing actuating of said further relay means, a discharge circuit for said condenser, and a footage control circuit controlling said discharge circuit and actuated by travel of a predetermined length of web thereby, and a variable resistor in said charging circuit for adjusting the duration of the correction cycle.

4. A control system for controlling alignment of a plurality of webs at a remote station comprising roll position control circuits each for association with one of a plurality of unwind stands for adjusting the lateral position of rolls carried thereby, edge-alignment sensing circuits each for association with one of said webs at the remote station, and selector switch means associated with each of said sensing circuits and for connecting each of said sensing circuits with selected ones of said roll position control circuits.

5. A control system for controlling alignment of a plurality of webs at a remote station comprising roll position control circuits each for association with one of a plurality of unwind stands for adjusting the lateral position of rolls carried thereby, edge-alignment sensing circuits each for association with one of said webs at the remote station, and selector switch means associated with each of said sensing circuits and for connecting each of said sensing circuits with selected ones of said roll position control circuits, there being a greater number of roll position control circuits than edge-alignment sensing circuits whereby only certain of said roll position control circuits are active at the same time.

6. A control system for controlling alignment of a plurality of webs at a remote station, comprising a plurality of reversible motors for controlling the lateral position of a plurality of unwind roll stands, a motor control circuit for controlling operation of each of said motors, a plurality of edge-alignment sensing circuits each for controlling one of said webs at said remote station, and selector switch means associated with each of said sensing circuits for connecting said sensing circuits with at least two of said motor control circuits.

7. An edge sensing system comprising a sensing member for receiving the edge to be controlled and having pressure outlet means therein for obstruction by said edge, means for delivering gas under positive pressure above atmospheric pressure to said sensing member for discharge through said outlet means, a first static pressure diaphragm type electric switch in communication with the interior of said sensing member downstream of said outlet means and set for operation at a relatively lower positive pressure above atmospheric pressure in said sensing member corresponding to a position of the edge at a first limit position away from said outlet means, a second static pressure diaphragm type electric switch communicating with the interior of said sensing member downstream of said outlet means and set for operation at a substantially higher positive pressure above atmospheric pressure than said relatively lower pressure corresponding to a position of the edge at a second limit position with the edge obstructing said outlet means, partial obstruction of said outlet means giving rise to positive pressures in said sensing member between said relatively lower pressure and said higher pressure and being inoperative to operate said switches, and the switches thereby establishing a neutral range of position of said edge between said first and second limit positions, an unwind roll stand spaced a substantial distance from said sensing member for delivering an elongated web unwound at said roll stand to said sensing member, reversible motor means for shifting a roll on said roll stand in opposite lateral directions, first and second edge correction circuits controlling energization of said motor means in the respective opposite directions, and means controlling said first and second edge correction circuits including said first and second static pressure electric switches, respectively, and including a footage control switch having means driven by said web and responsive to the speed of travel of the web and operative by movement of a predetermined length of said web past said driven means to actuate said footage control switch, said footage control switch being only momentarily actuated, and timing means controlling the duration of each edge correction cycle initiated by said footage control switch, said static pressure electric switches thereby being inoperative to produce an edge correction cycle except upon momentary actuation of said footage control switch and then only during the period thereafter determined by said timing means.

8. A system for controlling the alignment of a moving web of material comprising a pneumatic edge sensing device for locating an edge of the web at a point in its travel, a pressure sensitive mechanism operating in response to the pressure in the edge sensing device upon mis-alignment of the web, an edge aligning mechanism connected to said pressure sensitive mechanism for shifting the web to correct for the mis-alignment thereof, and footage control means responsive to the speed of the moving web and controlling said edge aligning mechanism to limit correction of the position of the web to correction periods spaced at intervals corresponding to a predetermined length of said web traveling past said edge sensing device irrespective of speed variation to allow the result of a period of correction to be detected at the edge sensing device before the application of a further period of correction, an electronic circuit controlling the operation of the edge aligning mechanism and including a vacuum tube having a plate circuit and having a grid-cathode circuit, a relay in the plate circuit controlling operation of the edge aligning mechanism, a condenser in the grid-cathode circuit, a charging circuit for charging the condenser to a value preventing actuation of the relay, a discharge circuit for the condenser, and said footage control means having contacts controlling said discharge circuit for discharging said condenser each time a predetermined length of the web travels past said edge sensing device.

9. A system for controlling the alignment of a number of moving webs of material, comprising a pneumatic edge sensing device for locating an edge of each of the webs at a point in its travel, a pressure sensitive mechanism operating in response to the pressure in each of the edge sensing devices upon mis-alignment of the associated web, a plurality of roll stands each having an edge alignment mechanism operatively associated therewith, a timing device including a footage control switch associated with one of said webs and operatively associated with all of the edge aligning mechanisms for limiting the operation thereof to predetermined correction intervals, and selector switch means for connecting said edge sensing devices with certain of said alignment mechanisms all under control of said timing device.

References Cited in the file of this patent

UNITED STATES PATENTS

| | | |
|---|---|---|
| 1,945,981 | Quinby | Feb. 6, 1934 |
| 2,037,086 | Nash | Apr. 14, 1936 |
| 2,078,669 | King | Apr. 27, 1937 |
| 2,114,716 | Kunzle | Apr. 19, 1938 |
| 2,244,864 | Witham, Jr. | June 10, 1941 |
| 2,331,030 | King | Oct. 5, 1943 |
| 2,347,893 | Dickhaut | May 2, 1944 |
| 2,358,654 | Nordberg | Sept. 19, 1944 |
| 2,491,636 | Amos | Dec. 20, 1949 |
| 2,539,131 | Gundersen et al. | Jan. 23, 1951 |
| 2,654,599 | Frisebi et al. | Oct. 6, 1953 |
| 2,726,858 | Cherigie | Dec. 13, 1955 |